United States Defensive Publication [19] (H) [11] T105,603

Kennedy et al. [43] Jul. 2, 1985

[54] PROCESS FOR PRODUCING PHOSPHORIC ACID FROM LOW PURITY PHOSPHATE ROCK

[76] Inventors: George A. Kennedy, 2814 Alexander; James R. Lehr, 124 Riverview Dr., both of Florence, Ala. 35630

[21] Appl. No.: 655,012

[22] Filed: Sep. 27, 1984

[51] Int. Cl.[3] ..... C01B 25/16

[52] U.S. Cl. ..... 423/167

[57] ABSTRACT

Adjustment of the maximum soluble sulfate level in phosphoric acid taken from, for example, an existing, conventional wet-process phosphoric acid production facility prior to reacting same with low purity phosphate rock at a temperature ranging from 45° C. to 65° C. and for a period of time ranging from about 10 minutes to 60 minutes effects selective dissolution of calcium and phosphate values from the rock without incurring high codissolution of aluminum and iron impurities. After separation from the undissolved impurity-containing gangue, the resulting solution of calcium phosphate in phosphoric acid is returned to the conventional wet-process facility for subsequent treatment with sulfuric acid to produce phosphoric acid and calcium sulfate, while the gangue is washed to recover additional phosphate values, and the wash liquor is transported to the conventional facility where it is used to wash the calcium sulfate filter cake.

6 Claims, No Sheets Drawing,

25 Pages Specification

The file of this unexamined application may be inspected and copies thereof may be purchased (849 O.G. 1221, Apr. 9, 1968).